US009026341B2

(12) United States Patent
Noda

(10) Patent No.: US 9,026,341 B2
(45) Date of Patent: May 5, 2015

(54) APPARATUS FOR AND METHOD OF DETECTING ABNORMAL AIR-FUEL RATIO VARIATION AMONG CYLINDERS OF MULTI-CYLINDER INTERNAL COMBUSTION ENGINE

(75) Inventor: Kazuyuki Noda, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 314 days.

(21) Appl. No.: 13/526,924

(22) Filed: Jun. 19, 2012

(65) Prior Publication Data

US 2012/0330533 A1 Dec. 27, 2012

(30) Foreign Application Priority Data

Jun. 22, 2011 (JP) ................................. 2011-138732

(51) Int. Cl.

| | |
|---|---|
| ***B60T 7/12*** | (2006.01) |
| ***F02D 41/00*** | (2006.01) |
| *F02D 41/14* | (2006.01) |

(52) U.S. Cl.

CPC ........ *F02D 41/0085* (2013.01); *F02D 41/1441* (2013.01); *F02D 41/1454* (2013.01); *F02D 41/1498* (2013.01)

(58) Field of Classification Search

CPC ......................... F02D 41/2467; F02D 41/2454
USPC ........... 701/103, 104, 111-115; 123/434, 673
See application file for complete search history.

(56) References Cited

U.S. PATENT DOCUMENTS

| | | | | |
|---|---|---|---|---|
| 8,452,521 | B2 * | 5/2013 | Iwazaki et al. ................ | 701/103 |
| 8,712,667 | B2 * | 4/2014 | Nakano et al. ................ | 701/103 |
| 2012/0060805 | A1 * | 3/2012 | Nakano et al. ................ | 123/703 |
| 2013/0110380 | A1 * | 5/2013 | Tomimatsu et al. .......... | 701/104 |
| 2013/0144510 | A1 * | 6/2013 | Iwazaki et al. ................ | 701/104 |
| 2013/0179051 | A1 * | 7/2013 | Tomimatsu et al. .......... | 701/104 |

FOREIGN PATENT DOCUMENTS

| | | |
|---|---|---|
| JP | 2009-270543 A | 11/2009 |
| JP | 2010-112244 A | 5/2010 |

* cited by examiner

*Primary Examiner* — John Kwon

(74) *Attorney, Agent, or Firm* — Gifford, Krass, Sprinkle, Anderson & Citkowski, P.C.

(57) ABSTRACT

An apparatus for detecting an abnormal air-fuel ratio variation among cylinders of a multi-cylinder internal combustion engine includes: a detecting unit detecting the abnormal air-fuel ratio variation on the basis of output fluctuations of at least one predetermined target cylinder when fuel injection amount changing control for changing a fuel injection amount of the target cylinder by a predetermined amount is executed; and an air-fuel ratio control unit causing an air-fuel ratio detected on the basis of a signal output from an air-fuel ratio sensor provided in an exhaust passage to follow a predetermined target air-fuel ratio. When the fuel injection amount changing control is executed, a target air-fuel ratio in the air-fuel ratio feedback control is shifted from the predetermined target air-fuel ratio by an amount corresponding to an amount of change of the fuel injection amount of the target cylinder in the fuel injection amount changing control.

14 Claims, 9 Drawing Sheets

APPARATUS FOR AND METHOD OF DETECTING ABNORMAL AIR-FUEL RATIO VARIATION AMONG CYLINDERS OF MULTI-CYLINDER INTERNAL COMBUSTION ENGINE

CROSS REFERENCE TO RELATED APPLICATIONS

This application claims priorty to Japanese Patent Application No. 2001-138732 filed on Jun. 22, 2011, which is incorporated herein by reference in its entirety including the Specification, drawings and abstract.

BACKGROUND OF THE INVENTION

1. Field of the Invention

The invention relates to an apparatus and method for detecting an abnormal air-fuel ratio variation among cylinders of a multi-cylinder internal combustion engine.

2. Description of Related Art

Generally, in an internal combustion engine provided with an exhaust gas control system that uses a catalyst, it is necessary to control the mixture ratio of an air-fuel mixture burned in the internal combustion engine, that is, the air-fuel ratio, in order to purify toxic substances in exhaust gas using the catalyst with high efficiency. To control the air-fuel ratio, an air-fuel ratio sensor is provided in an exhaust passage of the internal combustion engine, and then feedback control is executed such that the air-fuel ratio detected by the air-fuel ratio sensor follows a predetermined target air-fuel ratio.

On the other hand, in a multi-cylinder internal combustion engine, air-fuel ratio control is usually executed over all the cylinders using the same control amount, so an actual air-fuel ratio may vary among the cylinders even when air-fuel ratio control is executed. At this time, if the variation is small, the variation may be absorbed by air-fuel ratio feedback control, and, in addition, toxic substances in exhaust gas may be purified by the catalyst. Therefore, such small variation does not influence exhaust emissions, and is not particularly problematic.

However, for example, if a fuel injection system or valve gear of an intake valve of part of the cylinders fails and, therefore, the air-fuel ratio significantly varies among the cylinders, exhaust emissions deteriorate and may be problematic. It is desirable that such a large air-fuel ratio variation that deteriorates exhaust emissions is detected as an abnormal variation.

For example, in an internal combustion engine described in Japanese Patent Application Publication No. 2010-112244 (JP 2010-112244 A), first, it is determined whether there is an imbalance in air-fuel ratio among the cylinders of the internal combustion engine on the basis of a value computed through air-fuel ratio feedback control. In the above internal combustion engine, main air-fuel ratio feedback control is executed on the basis of the result detected by an A/F sensor provided on the upstream side of a purification catalyst in an exhaust passage, and sub-air-fuel ratio feedback control is executed on the basis of the result detected by an $O_4$ provided on the downstream side of the purification catalyst. When the average of values computed through the sub-air-fuel ratio feedback control exceeds a normal value, it is determined that there is an imbalance in air-fuel ratio among the cylinders. Furthermore, in the internal combustion engine described in JP 2010-112244 A, when it is determined that there is an abnormal air-fuel ratio variation among the cylinders in this way, the process of reducing a fuel injection duration of each cylinder in a predetermined period of time is executed, and then the cylinder in which misfire occurs because of the reduction in the fuel injection duration is identified as the cylinder in which there is an imbalance in air-fuel ratio.

In the multi-cylinder internal combustion engine, fuel injection amount changing control that forcibly changes a fuel injection amount supplied to each cylinder is executed to thereby make it possible to detect an abnormal air-fuel ratio variation among the cylinders, that is, a situation in which there is an imbalance in air-fuel ratio among the cylinders. However, even when such fuel injection amount changing control is being executed, it may be understood that air-fuel ratio feedback control that causes the air-fuel ratio to follow a predetermined target air-fuel ratio, such as a stoichiometric air-fuel ratio, is executed. In this case, as a result of executing air-fuel ratio feedback control, the fuel injection amount changed through fuel injection amount changing control may be shifted or the fuel injection amount of each cylinder that is not subjected to fuel injection amount changing control may not be kept at a desired fuel injection amount. Thus, there may be the case where an abnormal air-fuel ratio variation among the cylinders is not easily detected because of such fuel injection amount changing control. On the other hand, when air-fuel ratio feedback control is merely stopped at the time detecting such an abnormal air-fuel ratio variation among the cylinders, the air-fuel ratio deteriorates and, as a result, an abnormal air-fuel ratio variation among the cylinders may not be appropriately detected or there may occur inconvenience, such as deterioration of drivability.

SUMMARY OF THE INVENTION

The invention provides an apparatus for and a method of detecting an abnormal air-fuel ratio variation among cylinders of a multi-cylinder internal combustion engine, with which it is possible to further appropriately detect an abnormal air-fuel ratio variation among cylinders in a multi-cylinder internal combustion engine.

An aspect of the invention relates to an apparatus for detecting an abnormal air-fuel ratio variation among cylinders of a multi-cylinder internal combustion engine. The apparatus includes: a fuel injection amount changing control unit that executes fuel injection amount changing control for changing a fuel injection amount of at least one predetermined target cylinder among the cylinders by a predetermined amount; an air-fuel ratio control unit that executes air-fuel ratio feedback control for causing an air-fuel ratio detected on the basis of a signal output from an air-fuel ratio detecting unit provided in an exhaust passage to follow a predetermined target air-fuel ratio, and that includes a target air-fuel ratio changing unit that, when the fuel injection amount changing control is executed, shifts a target air-fuel ratio in the air-fuel ratio feedback control from the predetermined target air-fuel ratio by an amount corresponding to an amount of change of the fuel injection amount of the at least one predetermined target cylinder in the fuel injection amount changing control; and a detecting unit that detects an abnormal air-fuel ratio variation among the cylinders on the basis of output fluctuations of the at least one predetermined target cylinder that occur when the fuel injection amount changing control is executed on the at least one predetermined target cylinder.

A second aspect of the invention relates to a method of detecting an abnormal air-fuel ratio variation among cylinders of a multi-cylinder internal combustion engine. The method includes: executing fuel injection amount changing control for changing a fuel injection amount of at least one predetermined target cylinder among the cylinders by a predetermined amount; executing air-fuel ratio feedback control for causing an air-fuel ratio detected on the basis of a signal output from an air-fuel ratio detecting unit provided in an exhaust passage to follow a predetermined target air-fuel ratio, and, when the fuel injection amount changing control is executed, shifting a target air-fuel ratio in the air-fuel ratio feedback control from the predetermined target air-fuel ratio by an amount corresponding to an amount of change of the fuel injection amount of the at least one predetermined target cylinder in the fuel injection amount changing control; and detecting an abnormal air-fuel ratio variation among the cylinders on the basis of output fluctuations of the at least one predetermined target cylinder that occur when the fuel injection amount changing control is executed on the at least one predetermined target cylinder.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, embodiments of the invention will be described with reference to the accompanying drawings.

Figure 1:
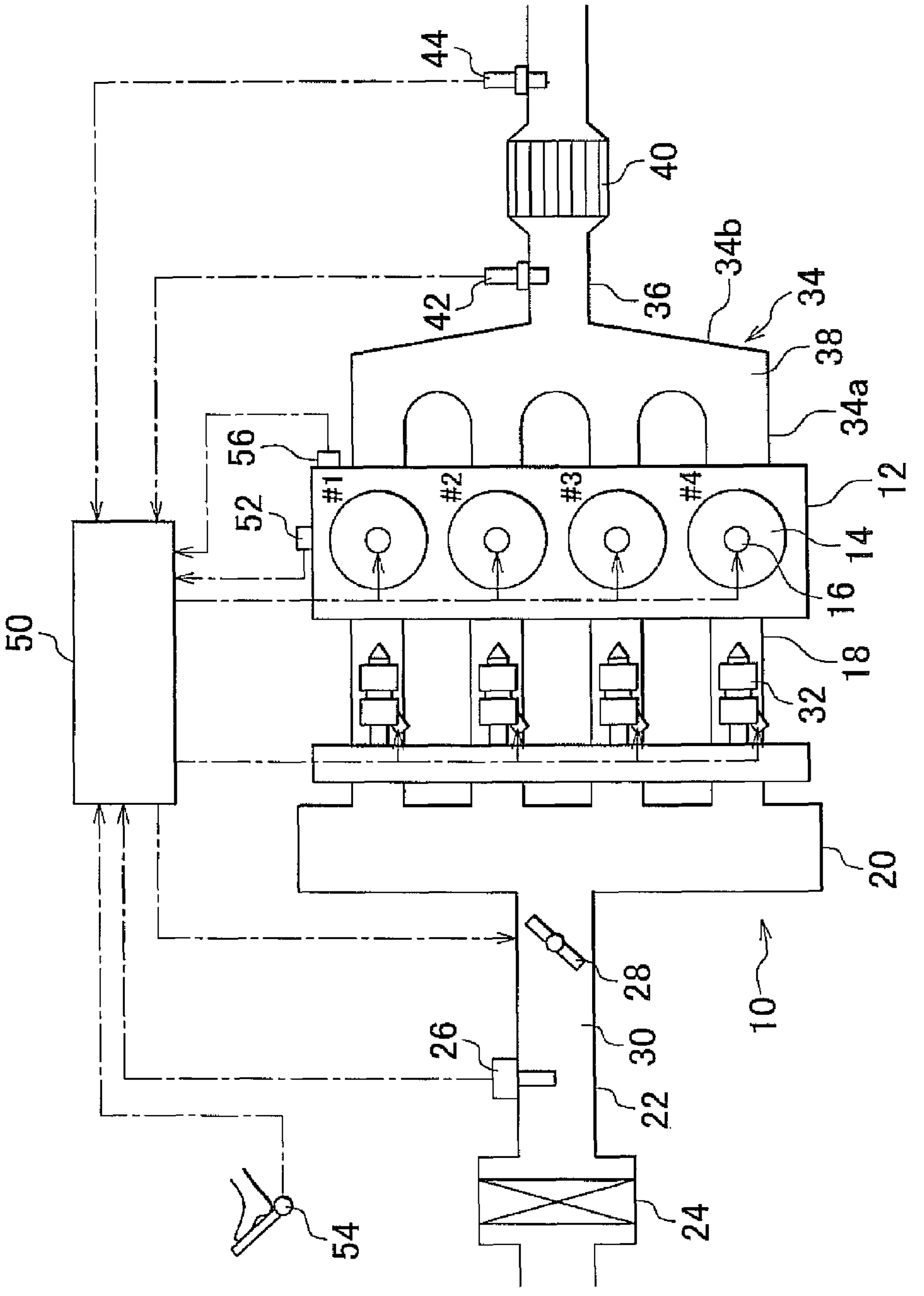
FIG. 1 is a schematic view of an internal combustion engine according to a first embodiment of the invention.

FIG. 1 is a schematic view of an internal combustion engine (engine) 10 according to a first embodiment of the invention. As shown in the drawing, the engine 10 burns a mixture of fuel and air in combustion chambers 14 formed in the engine 10 that includes a cylinder block 12 to reciprocally move pistons in the corresponding combustion chambers 14 to thereby generate power. The engine 10 is a four-stroke one-cycle engine. The engine 10 is a multi-cylinder internal combustion engine for an automobile, and is, more specifically, an in-line four-cylinder spark ignition internal combustion engine, that is, a gasoline engine. Here, the engine 10 is mounted on a vehicle. However, the internal combustion engine to which the aspect of the invention may be applied is not limited to such an internal combustion engine, the number of cylinders, the type, and the like, are not specifically limited as long as the internal combustion engine is a multi-cylinder internal combustion engine having two or more cylinders.

Although not shown in the drawing, an intake valve that opens or closes an intake port and an exhaust valve that opens or closes an exhaust port are arranged on the cylinder head of the engine 10 in correspondence with each of the cylinders. The intake valves and the exhaust valves are respectively opened or closed by camshafts. An ignition plug 16 for igniting an air-fuel mixture or fuel in the combustion chamber 14 is attached to the top of the cylinder head in correspondence with each cylinder.

The intake ports of the respective cylinders are connected to a surge tank 20 via branch pipes 18 of the cylinders. The surge tank 20 is an intake manifold chamber. An intake pipe 22 is connected to the upstream side of the surge tank 20, and an air cleaner 24 is provided at the upstream end of the intake pipe 22. Then, an air flow meter 26 and an electronically controlled throttle valve 28 are assembled to the intake pipe 22 in order from the upstream side. The air flow meter 26 is used to detect an intake air mass. An intake passage 30 is formed of the intake ports, the branch pipes 18, the surge tank 20 and the intake pipe 22.

Fuel injection valves (injectors) 32 that inject fuel into the intake passage 30, particularly, the corresponding intake ports, are arranged cylinder by cylinder. Fuel injected from each injector 32 is mixed with intake air to become an air-fuel mixture. The air-fuel mixture is taken into the combustion chamber 14 when the intake valve is open, compressed by the piston and then ignited and burned by the ignition plug 16.

On the other hand, the exhaust ports of the respective cylinders are connected to an exhaust manifold 34. The exhaust manifold 34 is formed of branch pipes 34*a* and an exhaust manifold portion 34*b*. The branch pipes 34*a* form the upstream portion of the exhaust manifold 34 in correspondence with the cylinders. The exhaust manifold portion 34*b* forms the downstream portion of the exhaust manifold 34. An exhaust pipe 36 is connected to the downstream side of the exhaust manifold portion 34*b*. An exhaust passage 38 is substantially formed of the exhaust ports, the exhaust manifold 34 and the exhaust pipe 36. A catalyst converter 40 that includes a three-way catalyst is installed in the exhaust pipe 36. The catalyst converter 40 constitutes an exhaust gas control device. Note that the catalyst converter 40 functions so as to purify NOx, HC and CO, which are toxic substances in exhaust gas, at the same time when the air-fuel ratio A/F of exhaust gas flowing into the catalyst converter 40 (exhaust gas air-fuel ratio) is near the stoichiometric air-fuel ratio (for example, A/F=14.6).

First and second air-fuel ratio sensors, that is, a pre-catalyst sensor 42 and a post-catalyst sensor 44, are respectively provided on the upstream side and downstream side of the catalyst converter 40 in order to detect the exhaust gas air-fuel ratio. These pre-catalyst sensor 42 and post-catalyst sensor 44 are provided in the exhaust passage at positions just before and just after the catalyst converter 40, and output signals on the basis of the oxygen concentration in exhaust gas. Note that the post-catalyst sensor 44 may not be provided. Note that the pre-catalyst sensor 42 and the post-catalyst sensor 44 each are an air-fuel ratio detecting unit; however, when the post-catalyst sensor 44 is omitted, only the pre-catalyst sensor 42 is provided as an air-fuel ratio detecting unit.

The above described ignition plugs 16, throttle valve 28, injectors 32, and the like, are electrically connected to an electronic control unit (ECU) 50. The ECU 50 is configured to substantially provide the functions of various control units (control devices) and various detecting units (detecting units) in the engine 10. The ECU 50 includes a CPU, a storage device that includes a ROM and a RAM, input/output ports, and the like (all of which are not shown). In addition, as shown in the drawing, in addition to the above described air flow meter 26, pre-catalyst sensor 42 and post-catalyst sensor 44, a crank angle sensor 52, an accelerator operation amount sensor 54, a coolant temperature sensor 56 and other various sensors (not shown) are electrically connected to the ECU 50 via an A/D converter (not shown), or the like. The crank angle sensor 52 detects the crank angle of the engine 10. The accelerator operation amount sensor 54 detects the accelerator operation amount. The coolant temperature sensor 56 detects the temperature of engine coolant. The ECU 50 controls the ignition plugs 16, the throttle valve 28, the injectors 32, and the like, on the basis of signals output from and/or values detected by various sensors, or the like, to thereby control the ignition timing, the fuel injection amount, the fuel injection timing, the throttle opening degree, and the like, so as to obtain desired output.

In this way, the ECU 50 has the functions of a fuel injection control unit, an ignition control unit, an intake air mass control unit, an air-fuel ratio control unit that is formed of a combination of part of these units, and the like. More specifically, as will be described later, the engine 10 is equipped with an apparatus for detecting an abnormal air-fuel ratio variation among the cylinders, and the ECU 50 substantially has the functions of a fuel injection amount changing control unit, the air-fuel ratio control unit and a detecting unit that detects an abnormal air-fuel ratio variation among the cylinders. Particularly, the portion of the ECU 50, which functions as the air-fuel ratio control unit, includes the function as a target air-fuel ratio changing unit that changes a target air-fuel ratio in air-fuel ratio feedback control, more specifically, that shifts a target air-fuel ratio from a predetermined target air-fuel ratio. Note that, in the present embodiment, the detecting unit includes an output fluctuation amount detecting unit and a comparing unit. The output fluctuation amount detecting unit is used to detect a value that indicates output fluctuations in the engine 10 (output fluctuation amount). The comparing unit compares the output fluctuation amount, detected by the output fluctuation amount detecting unit, with a predetermined value.

In addition, a throttle opening degree sensor (not shown) is provided for the throttle valve 28, and a signal output from the throttle opening degree sensor is transmitted to the ECU 50. The ECU 50 normally executes feedback control over the opening degree of the throttle valve 28 (throttle opening degree) toward an opening degree that is determined on the basis of an accelerator operation amount.

In addition, the ECU 50 detects the mass of intake air per unit time, that is, the intake air mass, on the basis of a signal output from the air flow meter 26. Then, the ECU 50 detects the load of the engine 10 on the basis of at least one of the detected accelerator operation amount, throttle opening degree and intake air mass.

The ECU 50 detects the crank angle and the rotation speed of the engine 10 on the basis of a crank pulse signal from the crank angle sensor 52. Here, the "rotation speed" means the number of revolutions per unit time. In the present embodiment, the rotation speed means the number of revolutions per minute (rpm). Note that the portion of the ECU 50, which substantially functions as the detecting unit that detects an abnormal air-fuel ratio variation among the cylinders, detects a value that indicates rotation fluctuations (rotation fluctuation amount) as an output fluctuation amount on the basis of a signal output from the crank angle sensor 52 that serves as an output detecting unit.

Then, the ECU 50 normally uses data, and the like, prestored in the storage device to set a fuel injection amount (or fuel injection duration) on the basis of the intake air mass and the engine rotation speed, that is, the engine operating state. Then, fuel injected from the injectors 32 is controlled on the basis of the set fuel injection amount. Note that the fuel injection amount based on such fuel injection control during normal times is termed normal fuel injection amount here.

Figure 2:
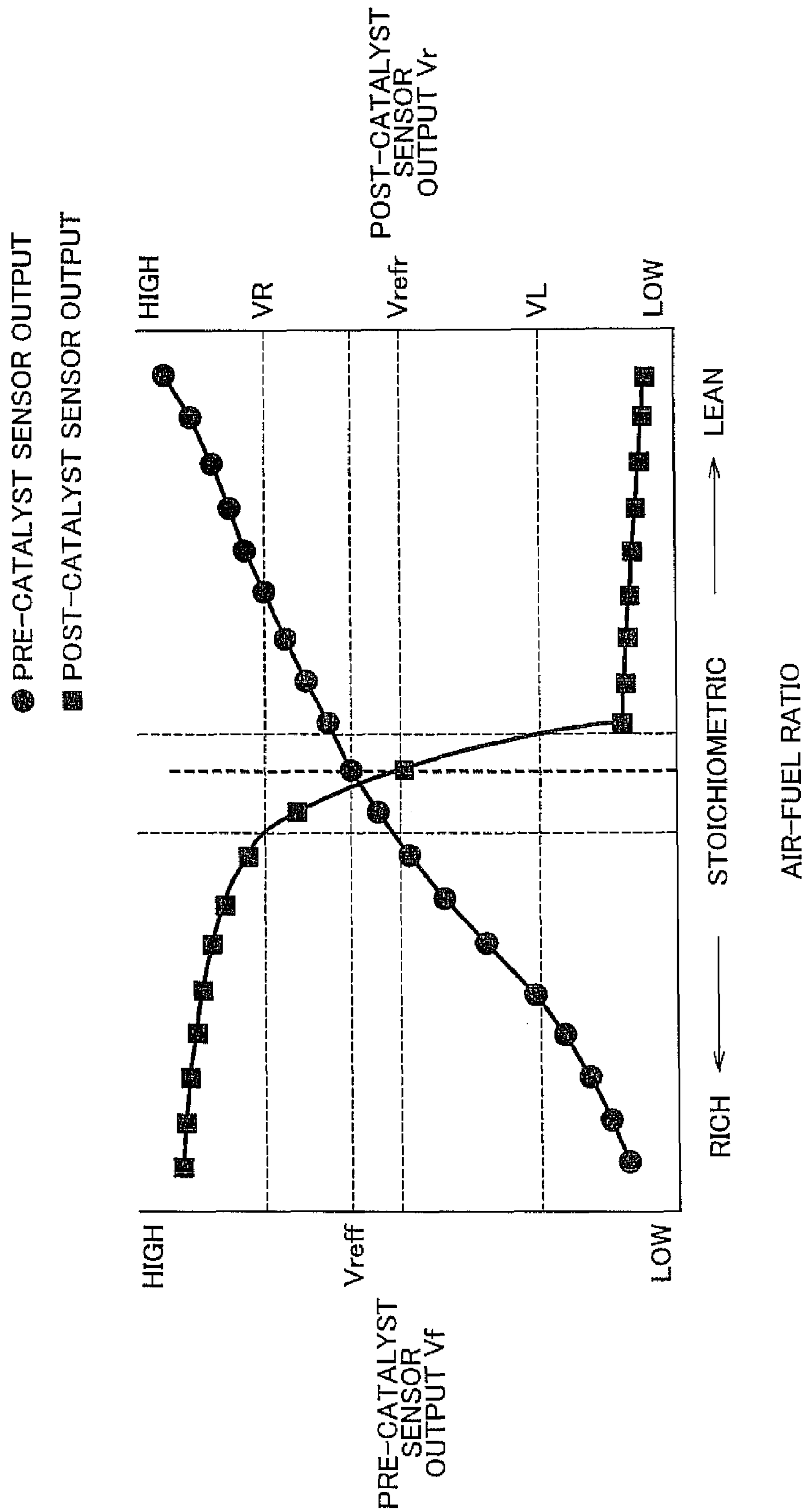
FIG. 2 is a graph that shows the output characteristics of a pre-catalyst sensor and the output characteristics of a post-catalyst sensor.

Incidentally, the pre-catalyst sensor 42, which is an air-fuel ratio sensor, is formed of a so-called wide range air-fuel ratio sensor, and is able to continuously detect an air-fuel ratio over a relatively wide range. FIG. 2 shows the output characteristics of the pre-catalyst sensor 42. As shown in the graph, the pre-catalyst sensor 42 outputs a voltage signal Vf having a level that is proportional to a detected exhaust gas air-fuel ratio (pre-catalyst air-fuel ratio A/Ff). When the exhaust gas air-fuel ratio is a stoichiometric air-fuel ratio (for example, A/F=14.5), the output voltage is Vreff (for example, about 3.3 V).

On the other hand, the post-catalyst sensor 44, which is an air-fuel ratio sensor, is formed of a so-called $O_2$ sensor, and has such characteristics that the output value steeply varies at the stoichiometric air-fuel ratio. FIG. 2 shows the output characteristics of the post-catalyst sensor 44. As shown in the drawing, when the exhaust gas air-fuel ratio (post-catalyst air-fuel ratio A/Fr) is the stoichiometric air-fuel ratio, the output voltage, that is, a stoichiometric air-fuel ratio corresponding value, is Vrefr (for example, 0.45 V). The output voltage of the post-catalyst sensor 44 varies within a predetermined range (for example, from 0 to 1 V). Generally, when the exhaust gas air-fuel ratio is leaner than the stoichiometric air-fuel ratio, the output voltage Vr of the post-catalyst sensor is lower than the stoichiometric air-fuel ratio corresponding value Vrefr; whereas, when the exhaust gas air-fuel ratio is richer than the stoichiometric air-fuel ratio, the output voltage Vr of the post-catalyst sensor is higher than the stoichiometric air-fuel ratio corresponding value Vrefr.

The catalyst converter 40 includes a three-way catalyst, and, as described above, has the function of purifying NOx, HC and CO, which are toxic substances in exhaust gas, at the same time when the air-fuel ratio A/F' of exhaust gas flowing into the catalyst converter 40 is near the stoichiometric air-fuel ratio. However, the range (window) of air-fuel ratio, in which these three substances may be purified at the same time with high efficiency, is relatively narrow.

Then, during normal operation of the engine 10, air-fuel ratio control (stoichiometric air-fuel ratio control) is executed by the ECU 50 so as to bring the air-fuel ratio of exhaust gas flowing into the catalyst converter 40 close to the stoichiometric air-fuel ratio. The air-fuel ratio control is formed of main air-fuel ratio control (main air-fuel ratio feedback control) and sub-air-fuel ratio control (sub-air-fuel ratio feedback control). In the main air-fuel ratio control, the air-fuel ratio (specifically, fuel injection amount) of air-fuel mixture is subjected to feedback control such that the exhaust gas air-fuel ratio detected by the pre-catalyst sensor 42 is brought into coincidence with a predetermined target air-fuel ratio. In the sub-air-fuel ratio control, the air-fuel ratio (specifically fuel injection amount) of air-fuel mixture is subjected to feedback control such that the exhaust gas air-fuel ratio detected by the post-catalyst sensor 44 is brought into coincidence with the predetermined target air-fuel ratio. Specifically, in the main air-fuel ratio feedback control, a first correction coefficient is computed and then the fuel injection amount from each injector 32 is adjusted on the basis of the first correction coefficient in order for a current exhaust gas air-fuel ratio detected on the basis of a signal output from the pre-catalyst sensor 42 to follow the predetermined target air-fuel ratio. Then, furthermore, in the sub-air-fuel ratio feedback control, a second correction coefficient is computed on the basis of a signal output from the post-catalyst sensor 44 and then the first correction coefficient obtained through the main air-fuel ratio feedback control is corrected. However, in the present embodiment, the above predetermined target air-fuel ratio, that is, the reference air-fuel ratio (target air-fuel ratio) is the stoichiometric air-fuel ratio, and the fuel injection amount corresponding to the stoichiometric air-fuel ratio (referred to as stoichiometric air-fuel ratio corresponding amount) is a reference fuel injection amount (target fuel injection amount). However, the reference air-fuel ratio and the reference fuel injection amount may be set to other values.

Incidentally, for example, a failure, or the like, of the injector 32 may occur in part (particularly, one cylinder) of all the cylinders and, therefore, there may occur an imbalance in air-fuel ratio among the cylinders. For example, this is the case where the fuel injection amount of the cylinder #1 becomes larger than the fuel injection amount of each of the other cylinders #2, #3 and #4 because of poor valve closing of the corresponding injector 32 and, therefore, the air-fuel ratio of the cylinder #1 significantly deviates toward a rich side with respect to the air-fuel ratio of each of the other cylinders #2, #3 and #4.

In this case as well, when a relatively large correction amount is given through the above described air-fuel ratio feedback control, the air-fuel ratio of total gas (exhaust gas formed of exhaust gases from all the cylinders) supplied to the pre-catalyst sensor 42 may be controlled to the stoichiometric air-fuel ratio. However, observing the air-fuel ratio cylinder by cylinder, the air-fuel ratio of the cylinder #1 is much richer than the stoichiometric air-fuel ratio, the air-fuel ratio of each of the cylinders #2, #3 and #4 is leaner than the stoichiometric air-fuel ratio, and then the air-fuel ratio of all the cylinders is the stoichiometric air-fuel ratio in total, so it is apparently undesirable in terms of exhaust emissions. Then, in the present embodiment, an apparatus for detecting the abnormal air-fuel ratio variation among the cylinders is provided.

Here, an imbalance percentage is used as an index value that indicates the degree of air-fuel ratio variation among the cylinders. The imbalance percentage is a value that, when a deviation in fuel injection amount is occurring in only one cylinder among the plurality of cylinders, indicates the percentage of deviation of the fuel injection amount of that cylinder (imbalance cylinder) in which the deviation of fuel injection amount is occurring from a fuel injection amount, that is, a reference injection amount, of each of the cylinders (balance cylinders) in which no deviation of fuel injection amount is occurring. Where the imbalance percentage is IB(%), the fuel injection amount of the imbalance cylinder is a and the fuel injection amount of each balance cylinder, that is, the reference injection amount, is $\beta$, IB=($\alpha$−$\beta$)$\beta$×100. As the imbalance percentage IB increases, the deviation of fuel injection amount of the imbalance cylinder with respect to the fuel injection amount of each balance cylinder increases, and the degree of air-fuel ratio variation increases.

On the other hand, in the present embodiment, the fuel injection amount of a predetermined target cylinder is actively or forcibly increased or reduced, and then an abnormal variation is detected on the basis of at least rotation fluctuations as output fluctuations of the target cylinder after increasing or reducing the fuel injection amount.

First, rotation fluctuations will be described. The rotation fluctuations mean a variation in engine rotation speed or a variation in crankshaft rotation speed. Then, in this specification, a value that indicates rotation fluctuations, that is, a value that indicates the degree of rotation fluctuations, as described above, is termed rotation fluctuation amount. For example, a period of time required for the crankshaft to rotate a predetermined angle is measured, and a value (amount) obtained by processing the measured value may be used as the rotation fluctuation amount. It may be understood from the following description with reference to FIG. 3 and FIG. 4 that various values may be used as the rotation fluctuation amount.

Figure 3:
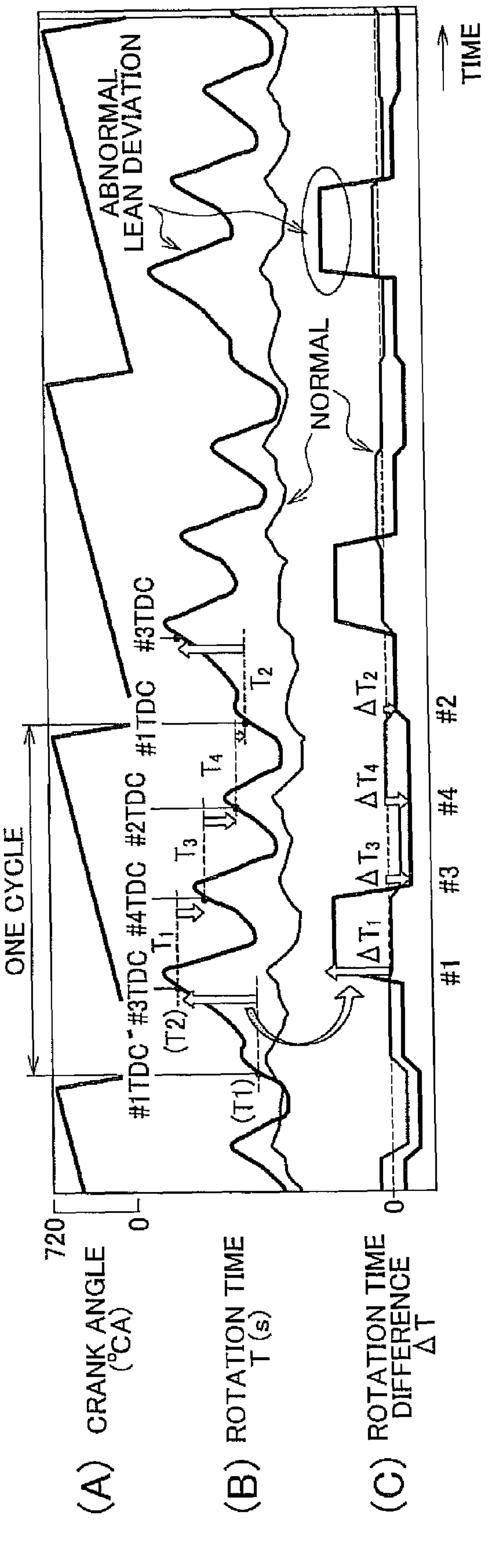
FIG. 3 is a time chart for illustrating values that indicate rotation fluctuations.

FIG. 3 shows a time chart as an example for illustrating rotation fluctuations. The illustrated example is an example of an in-line four-cylinder engine as well as the engine 10, and it may be understood that an engine of another type or another cylinder arrangement is also applicable similarly. Note that the ignition sequence in the example of FIG. 3 is the cylinder #1, the cylinder #3, the cylinder #4 and the cylinder #2.

In FIG. 3, (A) shows the crank angle (° CA) of the engine. One engine cycle is 720(° CA), and crank angles of multiple cycles, detected sequentially, are shown in the chart in a sawtooth shape.

In FIG. 3, (B) shows a period of time required for the crankshaft to rotate a predetermined angle, that is, a rotation time T (s). Here, the predetermined angle is 30(° CA); however, the predetermined angle may be another value (for example, 10(° CA)). As the rotation time T extends (increases in the chart), the engine rotation speed decreases; whereas, as the rotation time T reduces, the engine rotation speed increases. The rotation time T is detected by the ECU 50 on the basis of the signal output from the crank angle sensor 52.

In FIG. 3, (C) shows a rotation time difference ΔT (described later). In the chart, “normal” indicates a normal case where no air-fuel ratio deviation is occurring in any cylinder, and “abnormal lean deviation” indicates an abnormal case where a lean deviation having an imbalance percentage IB of −30% is occurring in the cylinder #1. The abnormal lean deviation can occur because of, for example, injection hole clogging or poor valve opening of the injector.

First, the rotation time T of each cylinder at the same timing is detected by the ECU. Here, the rotation time T at the time of the compression top dead center (TDC) of each cylinder is detected. The timing at which the rotation time T is detected is termed detection timing.

Subsequently, at each detection timing, the difference (T2−T1) between the rotation time T2 at the detection timing and the rotation time T1 at the last detection timing is calculated by the ECU. The difference is the rotation time difference ΔT shown in (C) of FIG. 3, and ΔT=T2−T1.

Usually, the rotation speed increases in the combustion stroke after the crank angle crosses the TDC, so the rotation time T reduces, and, the rotation speed decreases in the compression cycle thereafter, so the rotation time T increases.

However, when an abnoimal lean deviation is occurring in the cylinder #1 as shown in (B) of FIG. 3, sufficient torque (output) cannot be obtained and the rotation speed is hard to increase even when the cylinder #1 is ignited, so the rotation time T at the TDC of the cylinder #3 is long accordingly. Therefore, the rotation time difference ΔT at the TDC of the cylinder #3 is a large positive value as shown in (C) of FIG. 3. The rotation time and the rotation time difference at the TDC of the cylinder #3 are respectively set as the rotation time and rotation time difference of the cylinder #1, and are respectively denoted by T1 and ΔT1. This also applies to the other cylinders.

Subsequently, the cylinder #3 is normal, so the rotation speed steeply increases when the cylinder #3 is ignited. By so doing, at the timing of the TDC of the next cylinder #4, the rotation time T is just slightly shorter than that at the timing of the TDC of the cylinder #3. Therefore, the rotation time difference ΔT3 of the cylinder #3, detected at the TDC of the cylinder #4 is a small negative value as shown in (C) of FIG.

3. In this way, the rotation time difference ΔT of any one of the cylinders is detected at each TDC of the ignition cylinder.

A similar tendency is also observed in the following TDC of the cylinder #2 and the TDC of the cylinder #1, and the rotation time difference ΔT4 of the cylinder #4 and the rotation time difference ΔT2 of the cylinder #2, which are detected at both the above timings, each are a small negative value. The above characteristics are repeated in each one engine cycle.

In this way, it may be found that the rotation time difference ΔT of each cylinder is a value that indicates the rotation fluctuations of each cylinder and is a value that correlates with the air-fuel ratio deviation amount of each cylinder. Then, the rotation time difference ΔT of each cylinder may be used as an index value of rotation fluctuations, that is, rotation fluctuation amount, of each cylinder. As the air-fuel ratio deviation amount of each cylinder increases, the rotation fluctuations of each cylinder increase, and the rotation time difference ΔT of each cylinder increases.

On the other hand, as shown in (C) of FIG. 3, during normal times, the rotation time difference ΔT is constantly around zero.

The case of the abnormal lean deviation is shown in the example of FIG. 3; however, there is a similar tendency in the case of an abnormal rich deviation, that is, the case where a large rich deviation is occurring in only one cylinder. This, is because, when a large rich deviation has occurred, combustion becomes insufficient even when ignited because of an excessive amount of fuel, sufficient torque cannot be obtained and rotation fluctuations increase.

Figure 4:
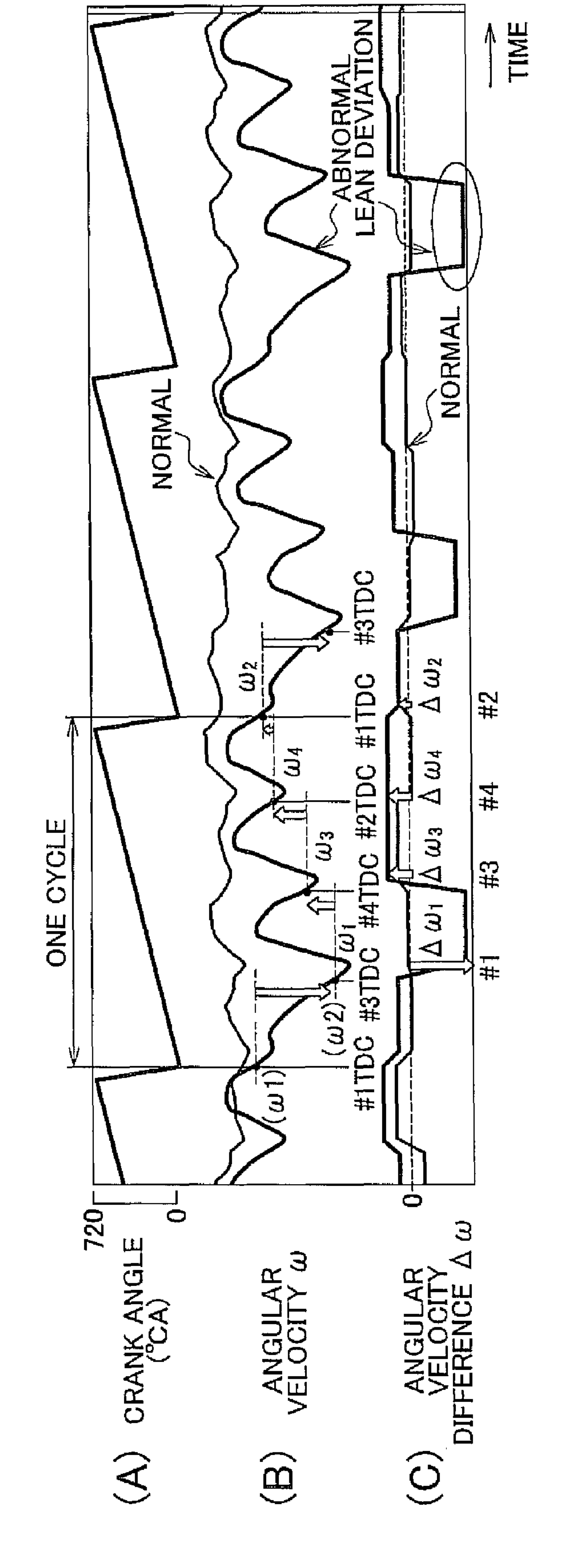
FIG. 4 is a time chart for illustrating other values that indicate rotation fluctuations.

Next, an example of another value that indicates rotation fluctuations, that is, another rotation fluctuation amount, will be described with reference to FIG. 4.(A) of FIG. 4 shows the crank angle (° CA) of the engine as in the case of (A) of FIG. 3.

(B) of FIG. 4 shows an angular velocity ω (rad/s) that is the inverse of the rotation time T. ω=1/T Of course, as the angular velocity ω increases, the engine rotation speed increases; whereas, as the angular velocity ω decreases, the engine rotation speed decreases. The waveform of the angular velocity ω has such a shape that is inverted upside down from the waveform of the rotation time T.

(C) of FIG. 4 shows an angular velocity difference Δω that is a difference in angular velocity ω as in the case of the rotation time difference ΔT. The waveform of the angular velocity difference Δω also has such a shape that is inverted upside down from the waveform of the rotation time difference ΔT. The "normal" and "abnormal lean deviation" in the chart are the same as those in FIG. 3.

First, the angular velocity ω of each cylinder at the same timing is detected by the ECU. Here, the angular velocity ω at the time of the compression top dead center (TDC) of each cylinder is detected. The angular velocity ω is calculated by dividing one by the rotation time T.

Subsequently, at each detection timing, the difference (ω2−ω1) between the angular velocity ω2 at the detection timing and the angular velocity ω1 at the last detection timing is calculated by the ECU. This difference is the angular velocity difference Δω shown in (C) of FIG. 4, and Δω=ω2−ω1.

Usually, the rotation speed increases in the combustion stroke after the crank angle crosses the TDC, so the angular velocity ω increases, and, the rotation speed decreases in the compression cycle thereafter, so the angular velocity ω decreases.

However, when an abnormal lean deviation is occurring in the cylinder #1 as shown in (B) of FIG. 4, sufficient torque cannot be obtained and the rotation speed is hard to increase even when the cylinder #1 is ignited, so the angular velocity ω at the TDC of the cylinder #3 is small accordingly. Therefore, the angular velocity difference Δω at the TDC of the cylinder #3 is a large negative value as shown in (C) of FIG. 4. The angular velocity and the angular velocity difference at the TDC of the cylinder #3 are respectively set as the angular velocity and angular velocity difference of the cylinder #1, and are respectively denoted by ω1 and Δω1. This also applies to the other cylinders.

Subsequently, the cylinder #3 is normal, so the rotation speed steeply increases when the cylinder #3 is ignited. By so doing, at the timing of the TDC of the next cylinder #4, the angular velocity ω is just slightly higher than that at the timing of the TDC of the cylinder #3. Therefore, the angular velocity difference Δω3 of the cylinder #3, detected at the TDC of the cylinder #4 is a small positive value as shown in (C) of FIG. 4. In this way, the angular velocity difference Δω of any one of the cylinders is detected at each TDC of the ignition cylinder.

A similar tendency is also observed in the following TDC of the cylinder #2 and the TDC of the cylinder #1, and the angular velocity difference Δω4 of the cylinder #4 and the angular velocity difference Δω2 of the cylinder #2, which are detected at both the above timings, each are a small positive value. The above characteristics are repeated in each one engine cycle.

In this way, it may be found that the angular velocity difference Δω of each cylinder is a value that indicates the rotation fluctuations of each cylinder and is a value that correlates with the air-fuel ratio deviation amount of each cylinder. Then, the angular velocity difference Δω of each cylinder may be used as an index value of rotation fluctuations, that is, rotation fluctuation amount, of each cylinder. As the air-fuel ratio deviation amount of each cylinder increases, the rotation fluctuations of each cylinder increase, and the angular velocity difference Δω of each cylinder reduces (increases in the negative direction).

On the other hand, as shown in (C) of FIG. 4, during normal times, the angular velocity difference Δω is constantly around zero.

As described above, there is a similar tendency in the case of the abnormal rich deviation.

Next, a variation in the rotation fluctuation amount when the fuel injection amount of one cylinder is actively, that is, forcibly, increased or reduced to vary the air-fuel ratio of that cylinder will be described with reference to the conceptual view of FIG. 5. However, in this case, when the fuel injection amount is actively increased or reduced, the operation of the throttle valve 28, and the like, is controlled such that the intake air mass remains unchanged.

Figure 5:
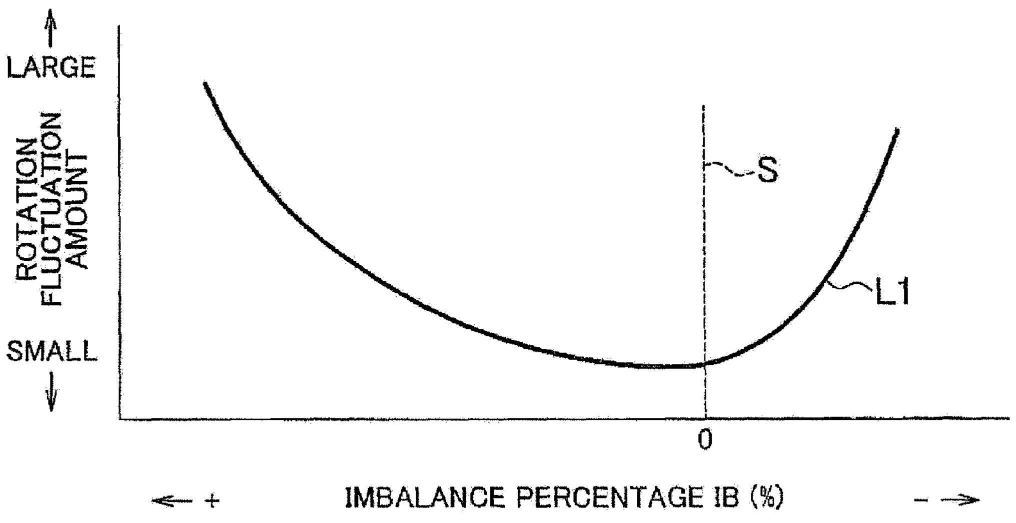
FIG. 5 is a graph that conceptually shows the correlation between the imbalance percentage and rotation fluctuation amount of a target cylinder.

In FIG. 5, the abscissa axis represents an imbalance percentage IB, and the ordinate axis represents a rotation fluctuation amount. Here, the fuel injection amount of one cylinder among all the four cylinders is increased or reduced to vary the imbalance percentage IB of the one cylinder, and the correlation between the imbalance percentage IB of the one cylinder and the rotation fluctuation amount of the one cylinder at this time is shown by a line L1. The one cylinder is termed an active target cylinder. It is assumed that the other cylinders each are a balance cylinder, and the fuel injection amount of each of the other cylinders is a stoichiometric air-fuel ratio corresponding amount as a reference injection amount.

Note that the imbalance percentage is used for the abscissa axis of FIG. 5; instead, the air-fuel ratio may be used for the abscissa axis of FIG. 5. In FIG. 5, the imbalance percentage increases in the positive direction toward the left side. In contrast to this, when the air-fuel ratio is used instead of the imbalance percentage, the air-fuel ratio becomes richer toward the left side in the graph.

The abscissa axis of FIG. 5 represents the imbalance percentage IB. In FIG. 5, as the imbalance percentage corresponding to the state where the fuel injection amount of the active target cylinder is the stoichiometric air-fuel ratio corresponding amount shifts leftward from a line S set at 0%, the imbalance percentage IB increases in the positive direction, and the fuel injection amount is excessively large, that is, a rich state. On the other hand, in FIG. 5, as the imbalance percentage IB shifts rightward from the line S set at 0%, the imbalance percentage IB increases in the negative direction (reduces), and the fuel injection amount is excessively small, that is, a lean state. In addition, in FIG. 5, the rotation fluctuation amount increases toward the upper side.

As is understood from the characteristic line L1, even when the imbalance percentage IB of the active target cylinder increases in the positive direction or increases in the negative direction from 0%, the rotation fluctuation amount of the active target cylinder tends to increase. Then, as the imbalance percentage IB is distanced from 0%, the inclination of the characteristic line L1 becomes steep, and a variation amount or variation percentage of the rotation fluctuation amount with respect to a variation amount or variation percentage of the imbalance percentage IB tends to increase.

Figure 6:
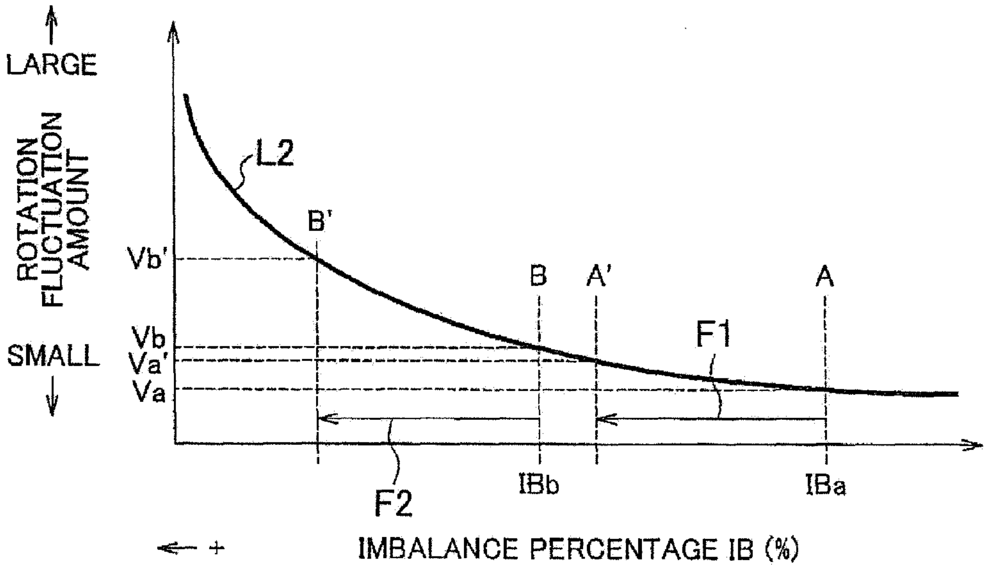
FIG. 6 is a graph that shows part of the characteristic line of FIG. 5 for illustrating the correlation between an increase in fuel injection amount and a variation in rotation fluctuation amount before and after the increase in fuel injection amount.

Here, FIG. 6 shows part of FIG. 5 in the range in which the imbalance percentage IB is positive. Note that a line L2 in FIG. 6 corresponds to part of the line L1 in FIG. 5.

In FIG. 6, examples of two imbalance percentages IB of the active target cylinder are indicated by lines A and B. The imbalance percentage IBa in the line A is an example that deviates from the imbalance percentage at 0%, which is the stoichiometric air-fuel ratio corresponding value, (see the line S in FIG. 5) in the positive direction but that falls within an allowable range. In contrast to this, the imbalance percentage IBb in the line B is an example that further deviates in the direction in which the fuel injection amount is much larger than that of the imbalance percentage IBa in the line A and that falls outside the allowable range.

Here, the case where the active target cylinder is in a state on the line A while stoichiometric air-fuel ratio control is being executed during normal operation is assumed. At this time, as indicated by the arrow F1, the fuel injection amount of the active target cylinder is forcibly increased by a predetermined amount Δf1. The predetermined amount Δf1 may be selectively set, and, for example, the fuel injection amount is increased by an amount corresponding to about 45% in the imbalance percentage. Because the inclination of the characteristic line L2 is gentle around IB=0% (right end side in FIG. 6), when the active target cylinder is in a state on the line A while stoichiometric air-fuel ratio control is being executed, a rotation fluctuation amount Va' in a state on the line A' when the fuel injection amount is increased is not significantly different from a rotation fluctuation amount Va before the fuel injection amount is increased.

On the other hand, the case where the active target cylinder is in a state on the line B while stoichiometric air-fuel ratio control is being executed is assumed. At this time, a rich deviation that falls outside the allowable range has been already occurring in the active target cylinder, and the imbalance percentage IBb is a relatively large positive value. For example, the imbalance percentage IBb in the line B corresponds to a rich deviation of about 60% in the imbalance percentage. When the fuel injection amount of the active target cylinder is forcibly increased by the same predetermined amount Δf1 in this state as indicated by the arrow F2, because the inclination of the characteristic line L2 is steep in the region that includes the line B' when the fuel injection amount is increased, a rotation fluctuation amount Vb' after the fuel injection amount is increased is considerably larger than a rotation fluctuation amount Vb before the fuel injection amount is increased, and the difference (Vb'−Vb) in rotation fluctuation amount between before and after the fuel injection amount is increased increases. That is, by increasing the fuel injection amount as described above, the rotation fluctuations of the active target cylinder sufficiently increase.

Thus, it is possible to detect an abnormal variation on the basis of at least the rotation fluctuation amount of the active target cylinder after the fuel injection amount of the active target cylinder is forcibly increased by a predetermined amount. For example, it is possible to determine that there is an abnormal variation when the magnitude of the rotation fluctuation amount (for example, |Vb'|) after the fuel injection amount is increased is larger than a predetermined amount. Furthermore, it is applicable that the average or statistically calculated value of rotation fluctuation amounts obtained for the active target cylinder in a plurality of cycles is set as a rotation fluctuation amount and it is determined whether there is an abnormal air-fuel ratio variation among the cylinders by comparing the rotation fluctuation amount with a predetermined amount. In this way, when there is an abnormal air-fuel ratio variation among the cylinders by increasing the fuel injection amount, the abnormal air-fuel ratio variation is remarkably reflected in combustion in the combustion chamber, that is, in a combustion state of air-fuel mixture, and the result is detected as a rotation fluctuation amount to thereby make it possible to detect an abnormal air-fuel ratio variation among the cylinders on the basis of the detected rotation fluctuation amount.

Note that, in the above description, an abnormal air-fuel ratio variation among the cylinders is detected by executing control for forcibly increasing the fuel injection amount by a predetermined amount (fuel injection amount increasing control). This is effective when the fuel injection amount deviates toward a large fuel injection amount in an imbalance cylinder.

On the other hand, when the fuel injection amount deviates toward a small fuel injection amount in an imbalance cylinder, it is effective to detect an abnormal variation by executing control for forcibly reducing the fuel injection amount by a predetermined amount Δf2 (fuel injection amount reducing control). The case where the fuel injection amount is forcibly reduced in the region in which the imbalance percentage is negative may also be understood from the above described case, so the description thereof is omitted. However, the amount of reduction 66 f2 in fuel injection amount reducing control is better to be smaller than the amount of increase Δf1 in fuel injection amount increasing control. This is because, when the fuel injection amount of a cylinder in which an abnormal lean deviation is occurring is excessively reduced, misfire may occur. However, the aspect of the invention does not exclude an embodiment that misfire is caused by reducing (or increasing) the fuel injection amount and an abnormal variation is detected on the basis of output fluctuations at that time. The predetermined amount Δf2 may be selectively set, and, for example, the fuel injection amount may be reduced by an amount corresponding to about 15% in the imbalance percentage. Note that the predetermined value that is a threshold for detecting an abnormal air-fuel ratio variation among the cylinders by executing fuel injection amount increasing control and a predetermined value that is a threshold for detecting an abnormal air-fuel ratio variation among the cylinders by, executing fuel injection amount reducing control may be the same or may be different.

Note that fuel injection amount increasing control or fuel injection amount reducing control may be applied to all the cylinders uniformly at the same time, and, in this case, all the cylinders are the predetermined target cylinders. However, in the present embodiment, fuel injection amount changing control is not applied to all the cylinders uniformly at the same time; fuel injection amount changing control is applied to only the predetermined target cylinder that is part of the cylinders at a time and then the target cylinder to which fuel injection amount changing control is applied sequentially changes to another one of the cylinders. That is, a method of applying fuel injection amount changing control includes not only a method of applying control to all the cylinders at the same time but also a method of applying control sequentially and alternately by a selected number of the cylinders. For example, there is a method of increasing the fuel injection amount by one cylinder, increasing the fuel injection amount by two cylinders or increasing the fuel injection amount by four cylinders. The number of target cylinders and the cylinder numbers of the target cylinders, of which the fuel injection amount is forcibly increased or reduced, may be selectively set.

As described above, in order to detect an abnormal air-fuel ratio variation among the cylinders, it is effective to increase the rotation fluctuation amount based on the imbalance percentage by executing control for forcibly increasing or reducing the fuel injection amount, that is, fuel injection amount changing control. However, when such fuel injection amount changing control is executed as well, air-fuel ratio feedback control is executed in the engine 10. However, in the air-fuel ratio feedback control at this time, the target air-fuel ratio is shifted from the predetermined target air-fuel ratio, which is the stoichiometric air-fuel ratio here, to an amount corresponding to the amount of change in fuel injection amount of the predetermined target cylinder in fuel injection amount changing control. By executing such air-fuel ratio feedback control with a change of the target air-fuel ratio at the time of detecting an abnormal air-fuel ratio variation among the cylinders, appropriate detection of an abnormal air-fuel ratio variation among the cylinders is ensured, and, for example, it is possible to reduce a situation that drivability deteriorates at the time of the detection.

Hereinafter, control for detecting an abnormal air-fuel ratio variation among the cylinders by executing air-fuel ratio control with a change of the target air-fuel ratio while executing fuel injection amount changing control for increasing or reducing the fuel injection amount with respect to a normal fuel injection amount in fuel injection control during normal times, that is, air-fuel ratio diagnostic control in the embodiment, will be described in accordance with the flow chart of FIGS. 7A and 7B.

Figure 7A:
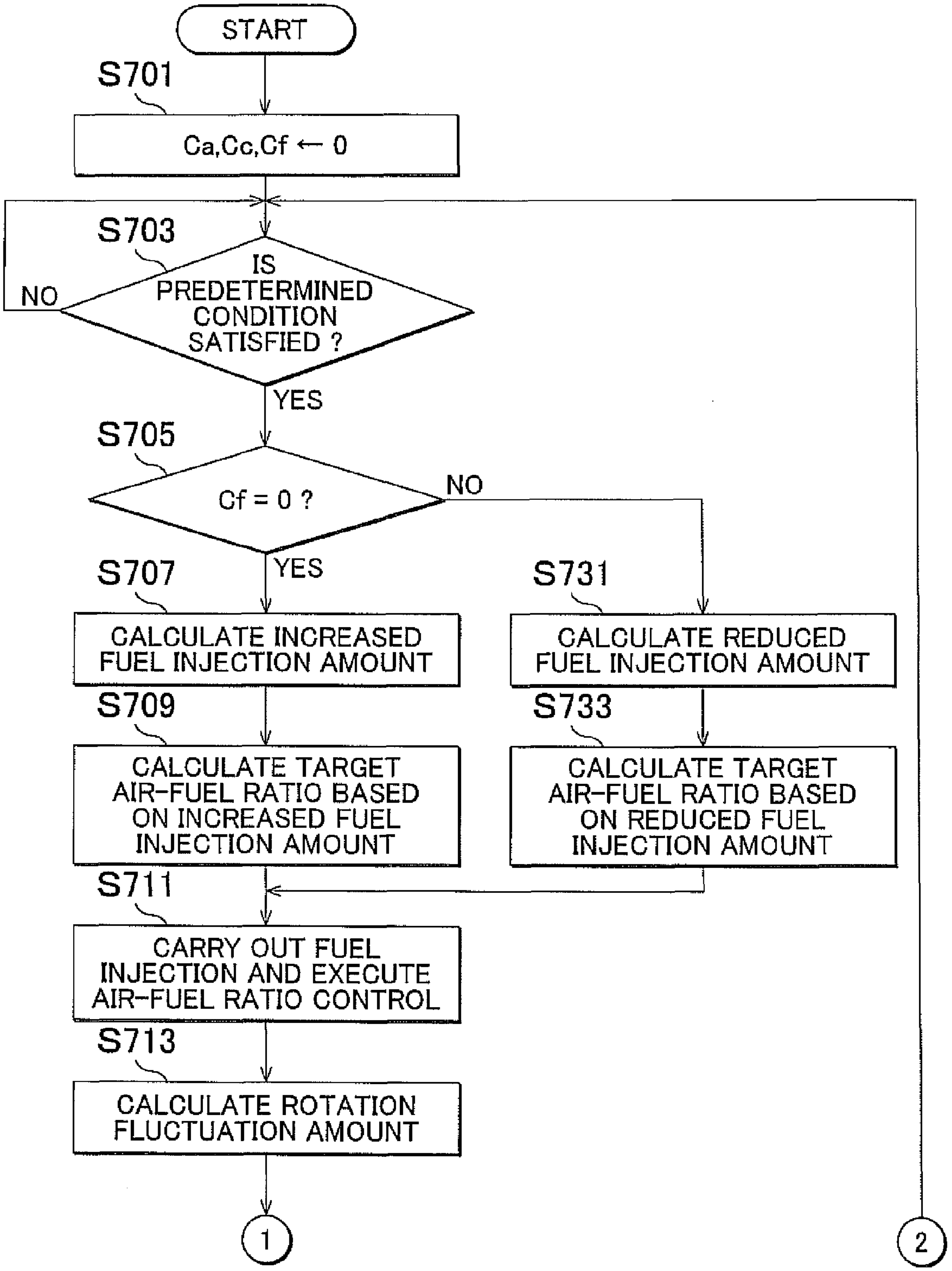
FIGS. 7A and 7B show a flow chart for illustrating the flow of processes according to the first embodiment.
Figure 7B:
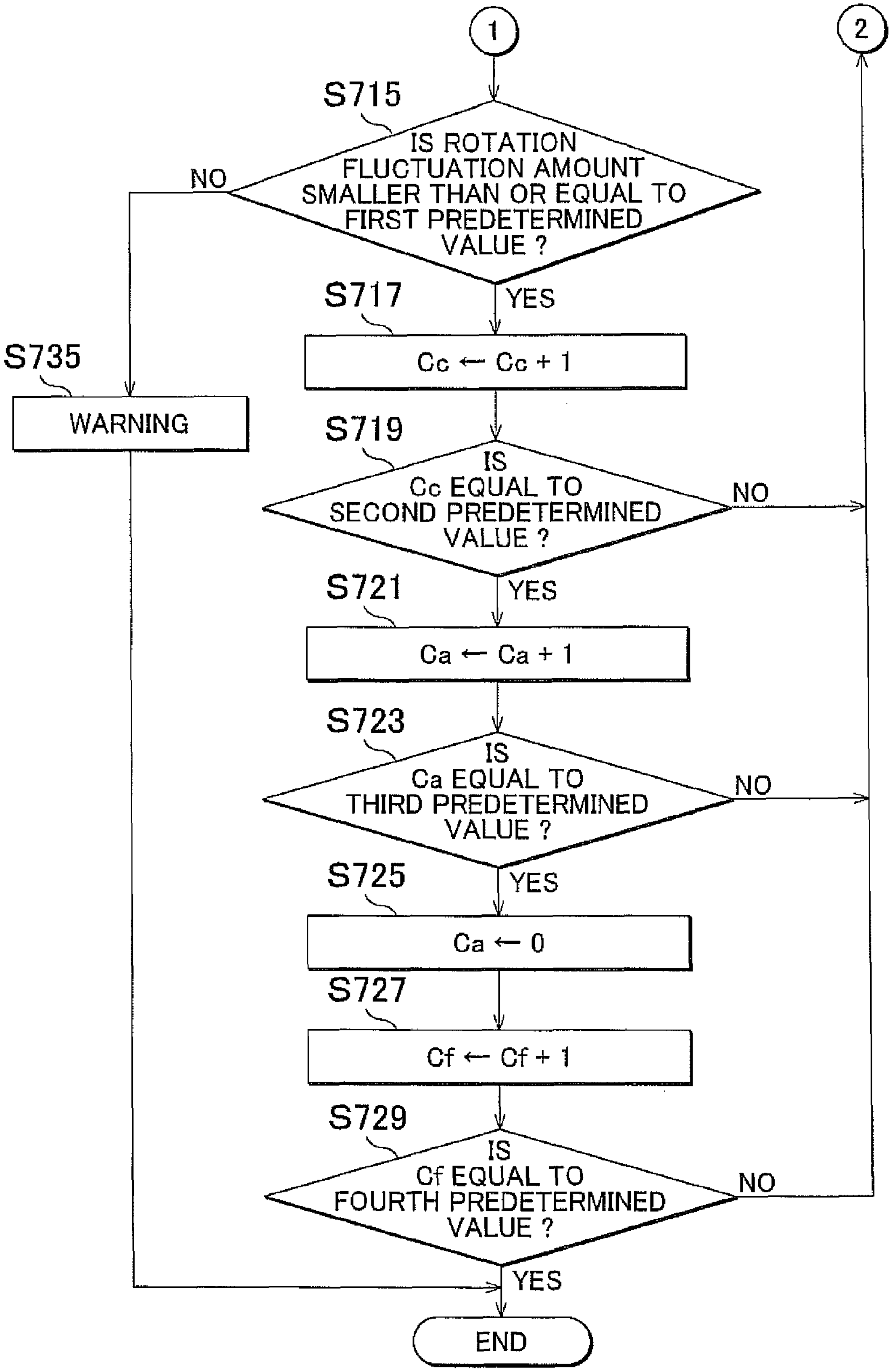

Note that air-fuel ratio diagnostic control described below in accordance with FIGS. 7A and 7B is an example of control that, when the engine is in a predetermined state, executes fuel injection amount changing control for forcibly increasing or reducing the fuel injection amount of a predetermined target cylinder by a predetermined amount, executes air-fuel ratio feedback control that causes the air-fuel ratio to follow the target air-fuel ratio that is set on the basis of the amount of change in the fuel injection amount of the predetermined target cylinder at that time, and an abnormal air-fuel ratio variation among the cylinders is detected on the basis of output fluctuations of the predetermined target cylinder, which occur because of the air-fuel ratio feedback control.

As the engine 1 is started, a target cylinder counter Ca, an execution counter Cc and a change counter Cf each are set at zero in step S701. The target cylinder counter Ca is a counter that indicates cylinders subjected to the above described air-fuel ratio diagnostic control, that is, the (active) target cylinders. In the present embodiment, the fuel injection amount is increased or reduced by two cylinders, and there are the case where the cylinders #1 and #4 are the target cylinders and the case where the cylinders #2 and #3 are the target cylinders.

Then, in step S703, it is determined whether a predetermined condition for executing air-fuel ratio diagnostic control is satisfied. Here, the condition that the engine is placed in a predetermined (operating) state after a start of the engine is set as the predetermined condition. Various predetermined conditions may be set. For example, the predetermined condition may be set to satisfy all of the condition that the engine coolant temperature is higher than or equal to a predetermined temperature (for example, 70° C.), the condition that the load falls within a predetermined range (for example, the intake air mass falls within a predetermined intake air mass range (for example, 15 to 50 g/s)), and the condition that the engine rotation speed falls within a predetermined engine rotation speed range (for example, 1500 rpm to 2000 rpm).

When the above predetermined condition is satisfied, normally, air-fuel ratio feedback control is being executed such that the exhaust gas air-fuel ratio follows the stoichiometric air-fuel ratio in order to further appropriately purify exhaust gas in the catalyst converter 40 as described above. Thus, determination in step S703 corresponds to determination as to whether air-fuel ratio control is executed so as to bring the exhaust gas air-fuel ratio into coincidence with the predetermined target air-fuel ratio, and, particularly, the predetermined target air-fuel ratio is the stoichiometric air-fuel ratio here. However, the predetermined target air-fuel ratio may be set at an air-fuel ratio other than the stoichiometric air-fuel ratio. Note that the aspect of the invention may set the predetermined condition so as to include the condition that such air-fuel ratio control is being executed; however, the aspect of the invention may set the predetermined condition so as not to include that condition.

When affirmative determination is made in step S703, it is determined in step S705 whether the change counter Cf is zero. Here, the change counter Cf is zero, so affirmative determination is made.

When affirmative determination is made in step S705, the increased fuel injection amount is calculated in step S707. Here, first, the amount of change as a predetermined amount for increasing the fuel injection amount is calculated. The amount of change is calculated by searching for data used to increase the fuel injection amount, prestored in the storage device, on the basis of the engine rotation speed and the engine load. Predetermined computation may be performed on the basis of a predetermined arithmetic expression. For example, the amount of change for increasing the fuel injection amount, such as 40% and 45%, is calculated as the amount of change. Note that the amount of change may be not variable in that way but constant. Then, the fuel injection amount of each of the cylinders corresponding to the target cylinder counter Ca is changed on the basis of the amount of change. For example, the target cylinders in the case where the target cylinder counter Ca is zero are cylinders #1 and #4, so the calculated amount of change is added to the fuel injection amount calculated for basic control, that is, normal control, of those cylinders, that is, the above described normal fuel injection amount, to thereby set the fuel injection amount in fuel injection amount changing control. For example, when 40% is set as the amount of change, the changed fuel injection amount is 140% of the normal fuel injection amount. Note that, here, the normal fuel injection amount is the stoichiometric air-fuel ratio corresponding amount.

Subsequently, in step S709, the target air-fuel ratio based on the amount of change of the fuel injection amount in step S707 is calculated. The percentage of change of the fuel injection amount of each of all the target cylinders at the same timing is divided by the number of all the cylinders, and the control center, that is, the target air-fuel ratio, in air-fuel ratio feedback control is shifted by that percentage to calculate the target air-fuel ratio. Specifically, by using the case where 40% is set as the amount of change in step S707 as an example, calculation of the target air-fuel ratio will be further described. As can be understood from the above description, the fuel injection amount of each of the cylinders #1 and #4 is increased by 40% from the normal fuel injection amount, and the fuel injection amount of each of the other cylinders #2 and #3 is kept at the normal fuel injection amount. Thus, 80% of the normal fuel injection amount of one cylinder is increased as a whole. This apparently corresponds to a situation that 20% of the normal fuel injection amount is increased in each cylinder. Then, the air-fuel ratio corresponding to a situation that the fuel injection amount in all the cylinders is increased by 20% of the normal fuel injection amount is calculated as the target air-fuel ratio. Specifically, where the stoichiometric air-fuel ratio is 14.5, 12.1, which is obtained by dividing 14.5 by 1.2, is calculated as the target air-fuel ratio in this case. Note that this corresponds to a situation that the target air-fuel ratio is changed (shifted) from the predetermined target air-fuel ratio (reference air-fuel ratio) by a predetermined amount corresponding to the amount of change of the fuel injection amount in step S707.

Then, in step S711, fuel in the amount calculated in step S707 is injected from each of the injectors 32 of the respective cylinders #1 and #4 that are the target cylinders, and air-fuel ratio feedback control is executed such that the exhaust gas air-fuel ratio follows the target air-fuel ratio calculated in step S709 while fuel injection amount changing control is being executed in this way.

The rotation fluctuation amount that occurs when fuel injection amount changing control and air-fuel ratio control are being executed in this way is calculated in step S713 on the basis of the signal output from the crank angle sensor 52 as described above. It is determined in step S715 whether the rotation fluctuation amount calculated in step S713 is smaller than or equal to a first predetermined value. The first predetermined value is set in order to detect an abnormal air-fuel ratio variation among the cylinders, and, in the engine 10, the rotation fluctuation amount up to the first predetermined value is allowed.

When affirmative determination is made in step S715 because the rotation fluctuation amount is smaller than or equal to the first predetermined value, the execution counter Cc is increased by one in step S717. Then, in step S719, it is determined whether the execution counter Cc is a second predetermined value. The second predetermined value may be set to any integer larger than or equal to one. Note that the execution counter Cc is set so as to set the period during which fuel injection amount changing control for injecting fuel in the amount calculated in step S707 and air-fuel ratio control for controlling the air-fuel ratio to the target air-fuel ratio calculated in step S709 are executed (step S711). For example, the execution counter Cc may be the period of one cycle or may be the period of a plurality of cycles, such as several tens of cycles.

When negative determination is made in step S719 because the execution counter Cc is not the second predetermined value, the process returns to step S703, and then the above steps are repeated.

In contrast to this, when affirmative determination is made in step S719 because the execution counter Cc is the second predetermined value, the target cylinder counter Ca is increased by one in step S721, and subsequently it is determined in step S723 whether the target cylinder counter Ca is a third predetermined value. Here, the third predetermined value is set at two on the basis of the fact that there are two groups, that is, the case where the cylinders #1 and #4 are the target cylinders and the case where the cylinders #2 and #3 are the target cylinders.

When negative determination is made in step S723 because the target cylinder counter Ca is not the third predetermined value, the process returns to step S703, the cylinders #2 and #3 are set as the target cylinders and then control based on the above steps is repeated.

When affirmative determination is made in step S723 because the target cylinder counter Ca is the third predetermined value, the target cylinder counter Ca is set at zero in step S725, and subsequently the change counter Cf is increased by one in step S727. Then, it is determined in step S729 whether the change counter Cf is a fourth predetermined value. The fourth predetermined value is set at two because there are two cases, that is, the case where the fuel injection amount is increased in fuel injection amount changing control and the case where the fuel injection amount is reduced in fuel injection amount changing control.

When the change counter Cf is set at one in step S727, negative determination is made in step S729, and the process returns to step S703. In step S705 after passing through step S703, it is determined whether the change counter Cf is zero as described above.

When negative determination is made in step S705 because the change counter Cf is one, the reduced fuel injection amount is calculated in step S731. Here, first, the amount of change as a predetermined amount for reducing the fuel injection amount is calculated. The amount of change is calculated by searching for data used to reduce the fuel injection amount, prestored in the storage device, on the basis of the engine rotation speed and the engine load, as in the case of the above description. Predetermined computation may be performed on the basis of a predetermined arithmetic expression. For example, the amount of change for reducing the fuel injection amount, such as 10% and 15%, is calculated as the amount of change. Then, the calculated amount of change is added to the fuel injection amount calculated for basic control, that is, normal control, of those cylinders corresponding to the target cylinder counter Ca, that is, the above described normal fuel injection amount, to thereby set the fuel injection amount in fuel injection amount changing control. For example, when 10% is set as the amount of change, the changed fuel injection amount is 90% of the normal fuel injection amount. Note that, here, the normal fuel injection amount is the stoichiometric air-fuel ratio corresponding amount.

Subsequently, in step S733, the target air-fuel ratio based on the amount of change of the fuel injection amount in step S731 is calculated. Step S733 is substantially the same as step S709. By using the case where 10% is set as the amount of change in step S731 is used as an example, calculation of the target air-fuel ratio will be described. As can be understood from the above description, when the target cylinder counter Ca is zero, the fuel injection amount of each of the cylinders #1 and #4 is reduced by 10% from the normal fuel injection amount, and the fuel injection amount of each of the other cylinders #2 and #3 is kept at the normal fuel injection amount. Thus, 20% of the normal fuel injection amount of one cylinder is reduced as a whole. This apparently corresponds to a situation that 5% of the normal fuel injection amount is reduced in each cylinder. Then, the air-fuel ratio corresponding to a situation that the fuel injection amount in all the cylinders is reduced by 5% of the normal fuel injection amount is calculated as the target air-fuel ratio. Specifically, where the stoichiometric air-fuel ratio is 14.5, 15.3, which is obtained by dividing 14.5 by 0.95, is calculated as the target air-fuel ratio in this case. Note that this corresponds to a situation that the target air-fuel ratio is changed (shifted) from the predetermined target air-fuel ratio (reference air-fuel ratio) by a predetermined amount corresponding to the amount of change of the fuel injection amount in step S731.

Then, after passing through step S733, the process proceeds to step S711, and then the above computation and control in the following steps S711 to S723 are executed. However, it is determined in step S715 whether the rotation fluctuation amount calculated in step S713 is smaller than or equal to the first predetermined value as described above; however, the first predetermined value may be varied between the case where the fuel injection amount is increased through step S707 and the case where the fuel injection amount is reduced through step S731.

When affirmative determination is made in step S723, the target cylinder counter Ca is set at zero in step S725, and subsequently the change counter Cf is increased by one in step S727. Then, it is determined in step S729 whether the change counter Cf is the fourth predetermined value. Then, when affirmative determination is made in step S729 because the change counter Cf is the fourth predetermined value, the diagnostic control is ended.

Note that, here, after the start of the engine 10, diagnostic control shown in FIGS. 7A and 7B is executed only once. However, the diagnostic control may be executed at appropriate timing. For example, when the operating time of the engine 10 or the travel distance of the vehicle equipped with the engine 10 becomes a predetermined value, diagnostic control may be executed.

On the other hand, when negative determination is made in step S715 because the rotation fluctuation amount exceeds the first predetermined value, for example, an alarm lamp provided on a front panel of a driver seat is lit up in step S735 in order to inform the driver that an abnormal air-fuel ratio variation among the cylinders has been detected. By so doing, diagnostic control of FIGS. 7A and 7B is ended.

When diagnostic control is ended in this way, that is, when fuel injection amount changing control is ended, normal fuel injection control is executed, and the change of the target air-fuel ratio from the predetermined target air-fuel ratio is cancelled. Thus, after that, air-fuel ratio feedback control may be executed such that the exhaust gas air-fuel ratio follows the returned original predetermined target air-fuel ratio.

Note that, in this way, in the present embodiment, when the abnormal variation has been detected in any one cylinder group or any one cylinder, diagnostic control of FIGS. 7A and 7B is ended; instead, the diagnostic control may be definitely executed individually for each of all the cylinders in order to identify the cylinder in which there is an abnormal air-fuel ratio variation among the cylinders.

Thus, in the above embodiment, fuel injection amount changing control starts to change the fuel injection amount by a predetermined amount, and, substantially at the same time, the target air-fuel ratio of air-fuel ratio feedback control is varied (shifted) on the basis of the amount of change through fuel injection amount changing control. However, it is also applicable that, fuel injection amount changing control starts to change the fuel injection amount by a predetermined amount, and then, after a lapse of a predetermined period, the target air-fuel ratio of air-fuel ratio feedback control is varied (shifted). Such an example will be now described as a second embodiment.

Next, the second embodiment according to the aspect of the invention will be described. The configuration of the engine to which the second embodiment is applied is substantially the same as the configuration of the engine 10 to which the first embodiment is applied, so, hereinafter, the description of the components of the engine to which the second embodiment is applied is omitted.

Figure 8A:
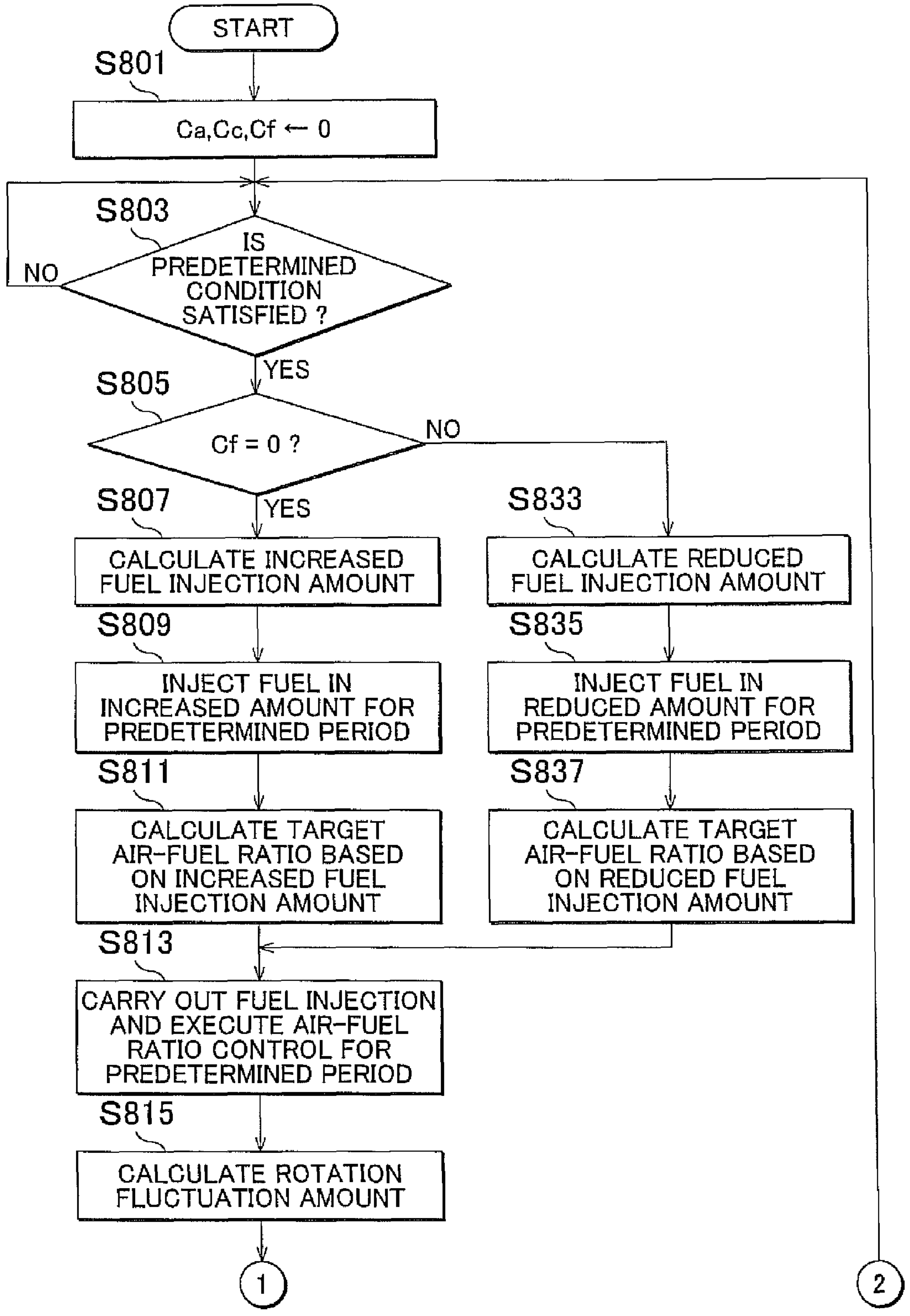
FIGS. 8A and 8B show a flow chart for illustrating the flow of processes according to a second embodiment.
Figure 8B:
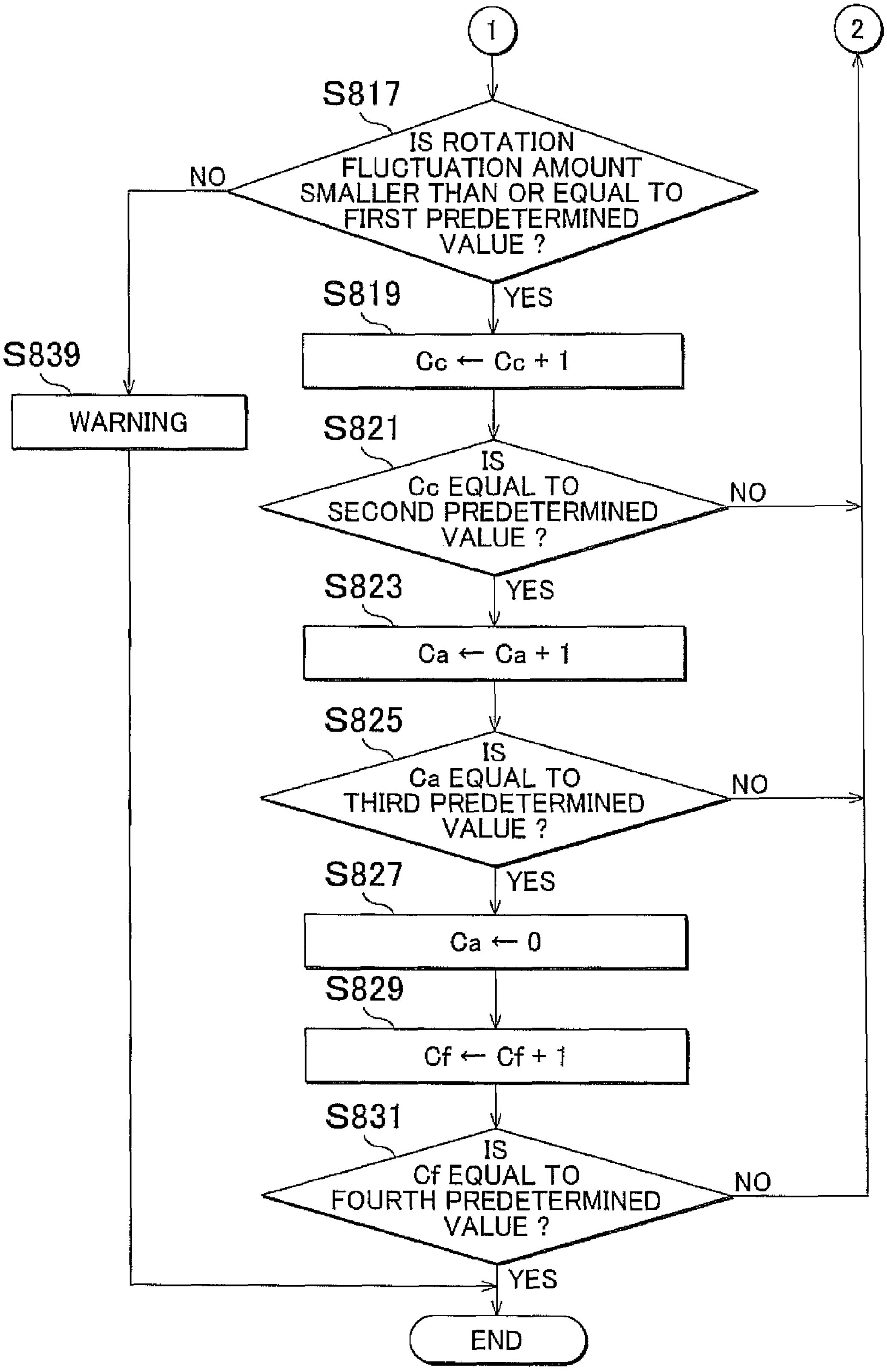

Hereinafter, air-fuel ratio diagnostic control in the second embodiment of the invention will be described with reference to the flow chart of FIGS. 8A and 8B. However, hereinafter, an example of control in which the target air-fuel ratio of air-fuel ratio feedback control is varied, that is, shifted from a predetermined target air-fuel ratio, on the basis of an air-fuel ratio that is detected when fuel injection amount changing control that changes the fuel injection amount by a predetermined amount is executed for a predetermined period while air-fuel ratio feedback control toward the predetermined target air-fuel ratio is being executed will be described. Note that steps S801 to S805, S817 to S831 and S839 of FIGS. 8A and 8B respectively substantially correspond to steps S701 to S705, S715 to S729 and S735 of FIGS. 7A and 7B, so the description of these steps is substantially omitted unless otherwise specifically described below.

When affirmative determination is made in step S805 because the condition for executing air-fuel ratio diagnostic control is satisfied in step S803 and the change counter Cf is zero, the increased fuel injection amount is calculated in step S807. Here, the amount of change of the fuel injection amount is constant, and, first, the amount of change is loaded from the storage device. Note that the amount of change may be variable as in the case of step S707. Then, the fuel injection amount of each of the cylinders corresponding to the target cylinder counter Ca is changed on the basis of the amount of change as described in step S707.

Then, in step S809, fuel in the amount increased in step S807 is injected in the predetermined target cylinders. Note that, at this time, fuel in the normal fuel injection amount is injected in the cylinders other than the predetermined target cylinders. Such fuel injection is carried out for a predetermined period. For example, fuel injection control is executed for at least one cycle, that is, at least once in each of all the cylinders; however, it is desirable that the predetermined period is short. Note that the air-fuel ratio at this time is detected by the sensor 42 and is stored.

Then, in the next step S811, the target air-fuel ratio is calculated. The target air-fuel ratio is calculated on the basis of the air-fuel ratio detected during the period of step S809. The air-fuel ratio of exhaust gas that receives the influence of the fuel injection amount changed in step S807 is detected on the basis of a signal output from the air-fuel ratio sensor 42 provided on the downstream side of the exhaust manifold portion 34*b*, and the target air-fuel ratio is shifted from the predetermined target air-fuel ratio till then by an amount of deviation between the detected air-fuel ratio and the predetermined target air-fuel ratio (here, stoichiometric air-fuel ratio). In this way, the target air-fuel ratio that is shifted from the predetermined target air-fuel ratio on the basis of the amount of change of the fuel injection amount of each of the predetermined target cylinders in fuel injection amount changing control is calculated.

Then, in step S813, air-fuel ratio feedback control toward the shifted target air-fuel ratio is executed, and fuel in the fuel injection amount increased in step S807 is injected for a predetermined period. The predetermined period may be selectively set, and may be at least one cycle.

Then, the rotation fluctuation amount is calculated in step S815 on the basis of the sensor output while control is being executed in step S813. Here, the average of a plurality of rotation fluctuation amounts is obtained as the rotation fluctuation amount. Then, the obtained rotation fluctuation amount is compared with the first predetermined value in step S817.

On the other hand, when the change counter Cf is set at one in step S829, negative determination is made in step S805, and the fuel injection amount reduced in step S833 is calculated. Here, the amount of change of the fuel injection amount is constant, and, first, the amount of change is loaded from the storage device. Note that the amount of change may be variable as in the case of step S731. Then, the fuel injection amount of each cylinder corresponding to the target cylinder counter Ca is changed on the basis of the amount of change as described in step S731.

Then, in step S835, fuel in the amount reduced in step S833 is injected in the predetermined target cylinders. Note that, at this time, fuel in the normal fuel injection amount is injected in the cylinders other than the predetermined target cylinders. Such fuel injection is carried out for a predetermined period. For example, fuel injection control is executed for at least one cycle, that is, at least once in each of all the cylinders; however, it is desirable that the predetermined period is short. Note that the air-fuel ratio at this time is detected by the sensor 42 and is stored.

Then, in the next step S837, the target air-fuel ratio is calculated. The target air-fuel ratio is calculated on the basis of the air-fuel ratio detected during the period of step S835. The air-fuel ratio of exhaust gas that receives the influence of the fuel injection amount changed in step S833 is detected on the basis of a signal output from the air-fuel ratio sensor 42, and the target air-fuel ratio is shifted from the predetermined target air-fuel ratio till then by an amount of deviation between the detected air-fuel ratio and the predetermined target air-fuel ratio. In this way, the target air-fuel ratio that is shifted from the predetermined target air-fuel ratio on the basis of the amount of change of the fuel injection amount of each of the predetermined target cylinders in fuel injection amount changing control is calculated. Then, step S813 and the following steps are executed.

Note that modifications, and the like, described in the first embodiment may also be applied to the second embodiment as long as there is no contradiction.

The aspect of the invention is described on the basis of the two embodiments, their alternative embodiments, and the like; however, the aspect of the invention allows another embodiment. In addition, the aspect of the invention may be applied to various multi-cylinder engines having two or more cylinders, and may be applied to not only a port-injection engine but also a direct-injection engine, an engine that uses gas as fuel, and the like.

In addition, in the above embodiments, the rotation fluctuation amount is used to determine or evaluate output fluctuations. Instead, another value or amount may be used.

The aspect of the invention is not limited to the above described embodiments. The aspect of the invention encompasses all alternative examples and application examples included in the idea of the invention defined by the appended claims and equivalents thereof. Thus, the aspect of the invention should not be interpreted restrictively. The aspect of the invention may also be applied to any other techniques that belong to the scope of the idea of the invention.

As the fuel injection amount changing control unit starts to change the fuel injection amount of the at least one predetermined target cylinder, the target air-fuel ratio changing unit may simultaneously shift the target air-fuel ratio in the air-fuel ratio feedback control from the predetermined target air-fuel ratio. Alternatively, after a lapse of a predetermined period from when the fuel injection amount changing control unit starts to change the fuel injection amount of the at least one predetermined target cylinder, the target air-fuel ratio changing unit may shift the target air-fuel ratio in the air-fuel ratio feedback control from the predetermined target air-fuel ratio. In this case, the target air-fuel ratio changing unit may shift the target air-fuel ratio in the air-fuel ratio feedback control from the predetermined target air-fuel ratio on the basis of the air-fuel ratio that is detected on the basis of the signal output from the air-fuel ratio detecting unit while air-fuel ratio feedback control for causing the air-fuel ratio to follow the predetermined target air-fuel ratio is being executed and the fuel injection amount changing control is being executed.

The target air-fuel ratio changing unit may return the target air-fuel ratio in the air-fuel ratio feedback control to the predetermined target air-fuel ratio when the fuel injection amount changing control is ended.

What is claimed is:

1. An apparatus for detecting an abnormal air-fuel ratio variation among cylinders of a multi-cylinder internal combustion engine, comprising:

a fuel injection amount changing control unit that executes fuel injection amount changing control for changing a fuel injection amount of at least one predetermined target cylinder among the cylinders by a predetermined amount;

an air-fuel ratio control unit that executes air-fuel ratio feedback control for causing an air-fuel ratio detected on the basis of a signal output from an air-fuel ratio detecting unit provided in an exhaust passage to follow a predetermined target air-fuel ratio, and that includes a target air-fuel ratio changing unit that, when the fuel injection amount changing control is executed, shifts a target air-fuel ratio in the air-fuel ratio feedback control from the predetermined target air-fuel ratio by an amount corresponding to an amount of change of the fuel injection amount of the at least one predetermined target cylinder in the fuel injection amount changing control; and a detecting unit that detects an abnormal air-fuel ratio variation among the cylinders on the basis of output fluctuations of the at least one predetermined target cylinder that occur when the fuel injection amount changing control is executed on the at least one predetermined target cylinder.

2. The apparatus according to claim 1, wherein as the fuel injection amount changing control unit starts to change the fuel injection amount of the at least one predetermined target cylinder, the target air-fuel ratio changing unit simultaneously shifts the target air-fuel ratio in the air-fuel ratio feedback control from the predetermined target air-fuel ratio.

3. The apparatus according to claim 1, wherein after a lapse of a predetermined period from when the fuel injection amount changing control unit starts to change the fuel injection amount of the at least one predetermined target cylinder, the target air-fuel ratio changing unit shifts the target air-fuel ratio in the air-fuel ratio feedback control from the predetermined target air-fuel ratio.

4. The apparatus according to claim 3, wherein the target air-fuel ratio changing unit shifts the target air-fuel ratio in the air-fuel ratio feedback control from the predetermined target air-fuel ratio on the basis of the air-fuel ratio that is detected on the basis of the signal output from the air-fuel ratio detecting unit while the air-fuel ratio feedback control for causing the air-fuel ratio to follow the predetermined target air-fuel ratio is being executed and the fuel injection amount changing control is being executed.

5. The apparatus according to claim 1, wherein the target air-fuel ratio changing unit returns the target air-fuel ratio in the air-fuel ratio feedback control to the predetermined target air-fuel ratio when the fuel injection amount changing control is ended.

6. The apparatus according to claim 1, wherein a value that indicates the output fluctuations is a rotation time difference of each cylinder.

7. The apparatus according to claim 1, wherein a value that indicates the output fluctuations is an angular velocity difference of each cylinder.

8. A method of detecting an abnormal air-fuel ratio variation among cylinders of a multi-cylinder internal combustion engine, comprising:

executing fuel injection amount changing control for changing a fuel injection amount of at least one predetermined target cylinder among the cylinders by a predetermined amount;

executing air-fuel ratio feedback control for causing an air-fuel ratio detected on the basis of a signal output from an air-fuel ratio detecting unit provided in an exhaust passage to follow a predetermined target air-fuel ratio, and, when the fuel injection amount changing control is executed, shifting a target air-fuel ratio in the air-fuel ratio feedback control from the predetermined target air-fuel ratio by an amount corresponding to an amount of change of the fuel injection amount of the at least one predetermined target cylinder in the fuel injection amount changing control; and detecting an abnormal air-fuel ratio variation among the cylinders on the basis of output fluctuations of the at least one predetermined target cylinder that occur when the fuel injection amount changing control is executed on the at least one predetermined target cylinder.

9. The method according to claim 8, wherein as the fuel injection amount of the at least one predetermined target cylinder starts to be changed, the target air-fuel ratio in the air-fuel ratio feedback control is simultaneously shifted from the predetermined target air-fuel ratio.

10. The method according to claim 8, wherein after a lapse of a predetermined period from when the fuel injection amount of the at least one predetermined target cylinder starts to be changed, the target air-fuel ratio in the air-fuel ratio feedback control is shifted from the predetermined target air-fuel ratio.

11. The method according to claim 10, wherein the target air-fuel ratio in the air-fuel ratio feedback control is shifted from the predetermined target air-fuel ratio on the basis of the air-fuel ratio that is detected on the basis of the signal output from the air-fuel ratio detecting unit while the air-fuel ratio feedback control for causing the air-fuel ratio to follow the predetermined target air-fuel ratio is being executed and the fuel injection amount changing control is being executed.

12. The method according to claim 8, wherein the target air-fuel ratio in the air-fuel ratio feedback control is returned to the predetermined target air-fuel ratio when the fuel injection amount changing control is ended.

13. The method according to claim 8, wherein a value that indicates the output fluctuations is a rotation time difference of each cylinder.

14. The method according to claim 8, wherein a value that indicates the output fluctuations is an angular velocity difference of each cylinder.

* * * * *